United States Patent
Gamal et al.

(10) Patent No.: US 6,671,338 B1
(45) Date of Patent: Dec. 30, 2003

(54) COMBINED INTERFERENCE CANCELLATION WITH FEC DECODING FOR HIGH SPECTRAL EFFICIENCY SATELLITE COMMUNICATIONS

(75) Inventors: Hesham El Gamal, Laurel, MD (US); Bassel Beidas, Alexandria, VA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/436,670

(22) Filed: Nov. 10, 1999

Related U.S. Application Data

(60) Provisional application No. 60/107,981, filed on Nov. 12, 1998.

(51) Int. Cl.$^7$ ................................................. H04B 1/10
(52) U.S. Cl. ....................... 375/346; 375/144; 375/148; 375/350; 375/341
(58) Field of Search ................................ 375/341, 340, 375/316, 346, 348, 349, 350, 144, 148

(56) References Cited

U.S. PATENT DOCUMENTS

| | | | | |
|---|---|---|---|---|
| 5,692,018 A | * | 11/1997 | Okamoto | 375/347 |
| 6,161,209 A | * | 12/2000 | Moher | 714/780 |
| 6,301,293 B1 | * | 10/2001 | Huang et al. | 375/130 |

OTHER PUBLICATIONS

Wang et al., "Turbo Multiuser Detection and Equalization for Coded CDMA in Multipath Channels", Oct. 5–9, 1998, IEEE 1998 International Conference on Universal Personal Communications, vol. 2, 1123–1127.*

* cited by examiner

*Primary Examiner*—Stephen Chin
*Assistant Examiner*—David B. Lugo
(74) *Attorney, Agent, or Firm*—John T. Whelan; Michael Sales

(57) ABSTRACT

A combined interference cancellation communication system employing forward error code (FEC) decoding for high spectral efficiency satellite communications. The disclosed system enables efficient utilization of available bandwidth through overlapping adjacent channels. A receiver is used to receive a waveform having data information and noise information. A filter bank is coupled with the receiver to receive and filter waveform and output channel information received by the receiver. The channel information received includes a combination of data signals and adjacent channel interference signals. Soft-input and soft-output decoders are provided to receive the channel information in order to calculate an estimated interference value. Additionally, the soft-input and soft-output interference canceler is provided for receiving the output channel information and the estimated interference value calculated from the decoders in order to provide a relatively more accurate estimated data signal. Typically, such systems employ remote ground terminals, e.g., VSAT, which are used for communicating via a geosynchronous satellite from a remote location to a central hub station or other remote locations. A particular advantage of the disclosed systems is their relatively low site cost and small earth station size.

12 Claims, 6 Drawing Sheets

COMBINED INTERFERENCE CANCELLATION WITH FEC DECODING FOR HIGH SPECTRAL EFFICIENCY SATELLITE COMMUNICATIONS

CROSS-REFERENCE TO RELATED APPLICATION

This application claims benefit of U.S. provisional application Serial No. 60/107,981, filed Nov. 12, 1998.

BACKGROUND OF THE INVENTION

1. Field of the Invention

The present invention relates generally to satellite communications and, more particularly, noise cancellation in narrowband satellite systems.

2. Description of the Related Art

Efficient use of available bandwidth in wireless, such as satellite, communications applications is a problem of paramount importance. An example of such a narrow band satellite includes very small aperture terminal (VSAT) systems. VSAT systems use compact earth stations that are installed at one or more customer's premises to provide links among the premises over a wide coverage area. Typically, in such systems, remote ground terminals are used for communicating via a geosynchronous satellite from a remote location to a central hub station or other remote locations. The central hub station communicates with multiple remote ground terminals. VSAT systems are used to handle customer network requirements, from small retail sites up to major regional offices, and can support two-way data, voice, multimedia, and other types of data. A particular advantage of these systems is their relatively low site cost and small earth-station size.

In wireless systems, multiple users share the same bandwidth. Channel sharing through fixed-allocation, demand assigned or random-allocation modes is known as multiple access. Two of the more commonly known basic multiple-access techniques include time division multiple access (TDMA) and code division multiple access (CDMA).

VSAT type systems have traditionally implemented TDMA using time division multiplexed (TDM) mode. Such systems generally are used for low speed (300 bps to 19,200 bps) data communications such as credit card processing and verification, point-of-sale inventory control and general business data connectivity. A typical TDM/TDMA network, when implemented in a star topology (FIG. 1), uses a large satellite hub system that manages all network terminal access and routing. Data is transmitted to and from the hub in short bursts on satellite channels that are shared with a number of other VSAT terminals. The hub communicates with these VSAT terminals over a higher speed outbound TDM satellite carrier. The terminals transmit back to the hub on assigned inbound carriers using TDM protocols. Such a combination enables a predetermined number of slots in time each second that each terminal can transmit data. In addition, more or less time can dynamically be assigned to the terminals based upon each terminal's individual requirements.

In contrast, in a CDMA type system a user's station signal is multiplied by a unique spreading code at a high speed to be spread in a wide frequency band. Thereafter, the signal is transmitted to a transmission path. In a receiving side, the signal that was multiplexed by the spreading code is subjected to a despreading process to detect a desired signal. Signal detection is based on a unique spreading code assigned to a user's station. If despreading is carried out with reference to a particular code used to spread a transmission signal, a user's station signal is correctly reproduced.

Regardless of the access technique used, increased efficiency and lower cost is a primary goal. Accordingly, efficiencies in bandwidth may be realized using techniques such as crowding of adjacent channels, frequency re-use, and increasing of data rates, generally resulting in an increased amount of data traveling through the limited amount of available bandwidth. Unfortunately, however, such techniques introduce a significant amount of interference which must be canceled. Combined multi-user detection and decoding is believed to have the potential to improve performance to match that of an interference-free system. However, most development heretofore has been in CDMA based systems. In particular, it is known that the optimum receiver for CDMA system employing Forward Error Control (FEC) coding combines the trellises of both the multi-user detector and the FEC code. However, the complexity of such a receiver is exponential in the product of the number of users and the constraint length of the code. This complexity makes the use of the optimal detector prohibitive for even small systems.

Accordingly, there is a need for a lower complexity cancellation scheme in narrow band type satellite applications that allows for efficient utilization of available bandwidth by eliminating the interference resulting from the aggressive channel crowding.

SUMMARY OF THE INVENTION

Briefly, the present invention relates to a satellite communications system and method for achieving efficient utilization of available bandwidth for satellite applications such as fixed wireless, mobile satellite systems and other narrowband type applications. A soft decision-feedback scheme is used iteratively in combination with Forward Error Correction (FEC) decoding for interference cancellation to enable efficient use of the available bandwidth through aggressive crowding of adjacent channels.

In a first embodiment of the present invention, a multiple channel decoding receiver is provided. The multiple channel receiver includes a matched-filter bank that is used to receive signals and provide initial estimates of data. The estimates are fed to an interference canceler and soft-input, soft-output decoders wherein soft interference estimates are generated by the decoders and fed back into the interference canceler. The soft estimates of the interfering signals are subtracted from the matched-filter outputs in the interference canceler to generate new, refined, soft approximations of the data. These refined soft estimates are then fed to the channel decoders for the next iteration. The process is repeated iteratively until the performance advantage is not commensurate with the computational load required to obtain it.

In another embodiment of the invention, a receiver equipped with a single channel decoder is provided. This receiver also includes a matched-filter bank that is used to demodulate multiple signals and provide initial estimates of data. The estimates are fed to a minimum mean squared error (MMSE) filter (interference canceler). The output of the interference canceler is fed to the decoder. After each decoding iteration, the decoder soft outputs are used to update the MMSE filter coefficients. The new coefficients are used by the MMSE filter to generate more accurate data estimates. The process is also repeated iteratively.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE INVENTION

The present invention relates to a satellite communications system and method for achieving efficient utilization of available bandwidth for satellite applications. In particular, a soft decision-feedback scheme is used iteratively for interference cancellation in combination with FEC decoding to enable efficient use of the available bandwidth using techniques such as crowding of adjacent channels, frequency re-use, and increasing the data rates. A particular advantage of such a system is the ability to eliminate interference, such as adjacent channel interference (ACI), that may be introduced during, for example, channel crowding, thereby resulting in a higher spectral efficiency. For example, the present embodiment enables a satellite system to operate at a bandwidth efficiency level of 2.66 bits-per-second/Hz with minimum additional energy requirement in the signal-to-noise ratio range of interest using only a four state FEC code. This corresponds to an approximately 55% improvement in spectral utilization over current systems that employ similar modulation techniques. This improvement is expected to increase when more efficient FEC codes are used.

Figure 2:
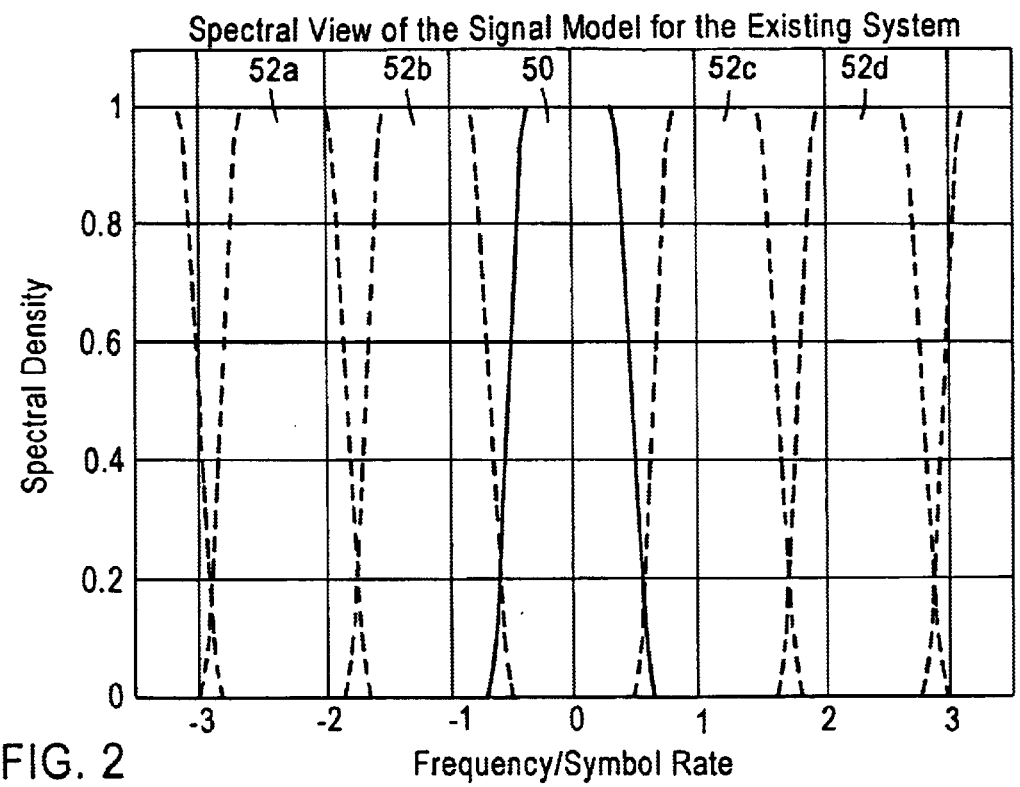
FIG. 2 is a schematic diagram of an exemplary ACI transmitter model in accordance with an embodiment of the present invention.

Turning now to FIG. 2, there is illustrated an exemplary VSAT system communicating in a TDMA mode. It is to be noted that the principals embodied in the present embodiment may also be applied to other satellite communications systems as well. As shown in the figure, the VSAT system, such as available from Hughes Network Systems, includes a central hub station 102 that controls one or more earth stations 104A–104B located on customers' premises. The earth stations 104A–104B and the central hub station 102 communicate with each other using a geosynchronous satellite 106. Each of the earth stations 104A–104B has a receiver 108A–108B for receiving and decoding signals received from the satellite 106 and transmitters 110A–110B for transmitting data to the satellite 106. The hub, or base station, station 102 similarly includes a receiver 112 for receiving and decoding signals received from the satellite 106 and a transmitter 114 for transmitting data to the satellite 106.

Figure 3:
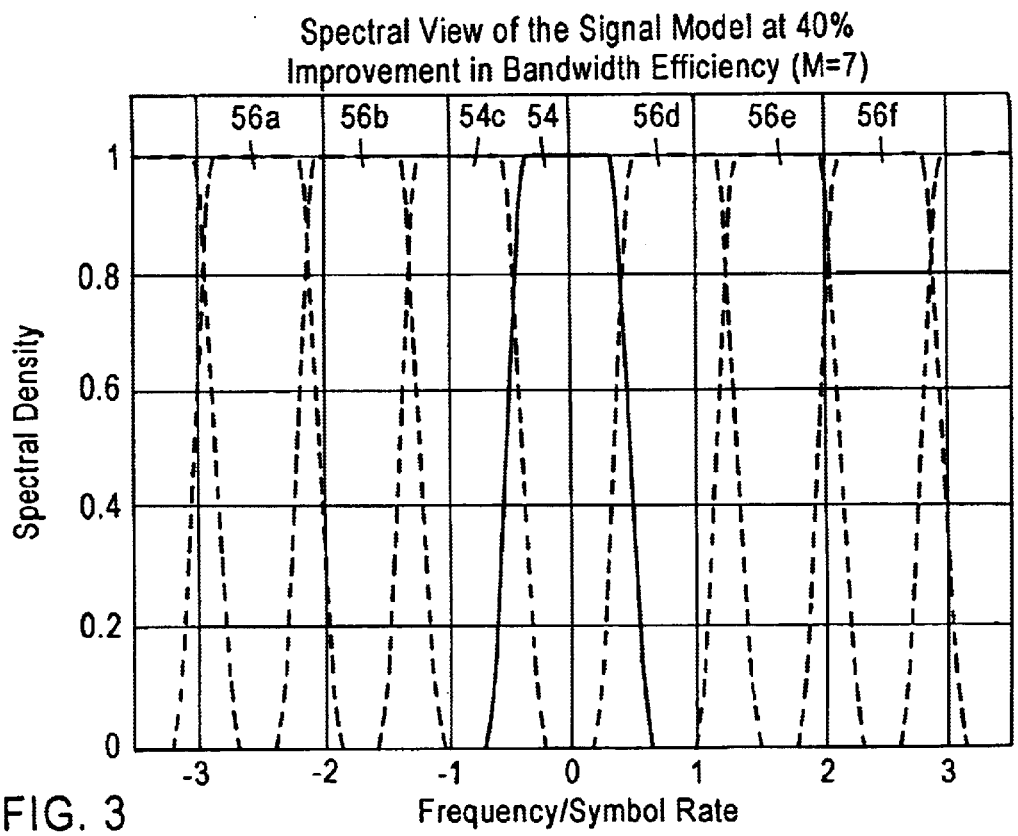
FIG. 3 is a block diagram of a first exemplary embodiment of an ACI receiver model in accordance with the present invention.

Turning to FIG. 3, an exemplary ACI transmitter model 120 is shown which may be used in the earth station transmitters 110A–110B and the hub transmitter 114. The transmitter 120 receives data from a first source 122A to an Mth source 122C. Converters 124A–124C convert the data from a binary phase shift keying (BPSK) signal to a quadrature phase shift keying (QPSK) signal. The resultant frequency domain pulse 126 is interleaved and transmitted as signal s(t) 128. The signal s(t) 128 which models the situation of adjacent channel interference caused by signal crowding, consists of the signal in noise as $$r(t)=s(t)+n(t) \qquad (1)$$

The n(t) is the standard additive white Gaussian noise (AWGN) with single-sided power spectral density level of $N_0$ (Watts/Hz). The signals s(t) models the situation of ACI in which there are M adjacent data sources that are identical and independent. Each source transmits a QPSK signal at the rate of $T_s^{-1}$ with an arbitrary unit-energy pulse shape p(t). The signal is described in complex form as $$s(t)=Re\{\tilde{s}(t)e^{j2\pi f_c t}\} \qquad (2)$$

where $f_c$ is the carrier frequency and $\tilde{s}(t)$ is the baseband complex envelope of the signal and is mathematically expressed as $$\tilde{s}(t)=\sum_{m=1}^{M}\sum_{k=-\infty}^{\infty}[a_{m,k}p(t-kT_s-\varepsilon_m T_s)e^{j(2\pi\Delta f_m t+\theta_m)}] \qquad (3)$$

The data streams $\{a_{m,i}; m=1, \ldots, M\}$ consist of QPSK symbols taking on the equi-likely values $(\pm 1 \pm j)$ and are statistically related as $$E\{a_{m,i}^* a_{n,j}\} = \begin{cases} 2, & m=n, i=j \\ 0, & \text{otherwise} \end{cases} \qquad (4)$$

Assuming without loss of generality that M is an odd integer and that the desired center, or (M+1)/2-th, conveys the desired data and that the other signals are viewed as being adjacent-channel interferers ((M−1)/2 ones on either side), namely $\Delta f_1 =< \ldots < \Delta f_{(m+1)/2} < \ldots < \Delta f_M$. The present embodiment is used when the channel spacing values, compared with that of the center channel, are small enough to cause large amounts of overlap in the spectra. Furthermore, in practical systems, these channels are equally spaced in frequency, say by $\Delta f$. In terms of the above, then $$\Delta f_m = \left(m - \frac{M+1}{2}\right)\Delta f; \quad m=1, 2 \ldots, M \qquad (5)$$

It is to be noted that M should not be interpreted as being the number of channels in the entire available bandwidth. Instead, it is the number of channels that the receiver wishes to process jointly to announce a decision regarding the desired data stream. Although the use of guard bands is known when separating channels, their use consumes a non-trivial amount of bandwidth, thereby decreasing spectral efficiency. Therefore, in the absence of an installed guard band, the outermost or "edge" channels, i.e., 1st and Mth, will always have interference. However, as described further below, the present embodiment does not require that the receiver compensate for these edge channels. For example, M is chosen to be seven. As such, the receiver processes seven channels in the presence of two additional signals. Note that in the presence of guard band at the edges of the M channels, the receiver will jointly receive all the M channels. This feature is particularly useful for the base-station which is interested in decoding more than one channel.

Two criteria of performance are considered. The first is the bandwidth efficiency, η, in bits-per-second/Hz defined as the ratio of the data rate to the bandwidth used. This quantity is obtained in this case as $$\eta \triangleq \frac{2}{\Delta f T_s} \quad (6)$$

The second is the energy efficiency defined as the signal-to-noise ratio per bit required to achieve a specific bit error probability $P_b(E)$ of the desired channel. Other measures of performance may also be used, such as symbol error probability and word error probability.

It can be seen that the interference-free performance is $$P_b(E) = Q\left(\sqrt{\frac{2E_b}{N_0}}\right) \quad (7)$$

where $E_b$ is the average bit energy and $Q(x)$ is defined as the Gaussian probability integral $$Q(x) \triangleq \int_x^\infty \frac{1}{\sqrt{2\pi}} e^{-\frac{y^2}{2}} dy \quad (8)$$

The performance described by the above equations is used as a benchmark to quantify the ability, of the proposed receivers to suppress interference.

From statistical theory of hypothesis testing, it is known that the optimum receiver is the one that minimizes sequence error probability and is derived from implementing the average likelihood-ration function (ALF). The likelihood function conditional on knowing a given signal is AWGN is then obtained as $$\Lambda(r(t)) = \exp\left(-\frac{1}{N_0} \int_{-\infty}^\infty |\tilde{r}(t) - \tilde{s}(t)|^2 dt\right) \quad (9)$$

where r(t) is the baseband complex envelope of the received waveform. Thus, $$\ln(\Lambda(\tilde{r}(t))) = -\frac{1}{N_0}\int_{-\infty}^\infty \left|\tilde{r}(t)\left[\sum_{m=1}^M \sum_{k=-\infty}^\infty a_{m,k} p(t-kT_s - \varepsilon_m T_s)e^{j(2\pi \Delta f_m t + \theta_m)}\right]\right|^2 dt$$

$$= -\frac{1}{N_0}\int_{-\infty}^\infty |\tilde{r}(t)|^2 dt +$$

$$\frac{1}{N_0}2\mathrm{Re}\left\{\int_{-\infty}^\infty \tilde{r}(t)\left[\sum_{m=1}^M \sum_{k=-\infty}^\infty a_{m,k} p(t-kT_s - \varepsilon_m T_s)e^{j(2\pi \Delta f_m t+\theta_m)}\right]^*\right\}dt -$$

$$\frac{1}{N_0}\int_{-\infty}^\infty \left|\sum_{i=1}^M \sum_{k=-\infty}^\infty a_{m,k}p(t-kT_s-\varepsilon_m T_s)e^{j(2\pi\Delta f_m t+\theta_m)}\right|^2 dt$$

(10)

By absorbing terms that are independent of the sought symbols and after some algebraic manipulations, maximizing the ALF over the information symbols is equivalent to maximizing the quantity $J(a_1, a_2, \ldots a_M)$ of the metric, defined as $$j(a_1, a_2, \ldots, a_m) \quad (11)$$

$$\triangleq 2\mathrm{Re}\left\{\sum_{k=-\infty}^\infty \left[\sum_{m=1}^M a_{m,k}^* x_m((k+\varepsilon_m)T_s)\right]\right\} -$$

$$\sum_{k=-\infty}^\infty \sum_{l=-\infty}^\infty \left[\sum_{m=1}^M \sum_{n=1}^M a_{m,k} C_{m,n}((k+\varepsilon_m T_{s'})(l+\varepsilon_n)T_s)a_{n,l}^*\right]$$

Figure 6:
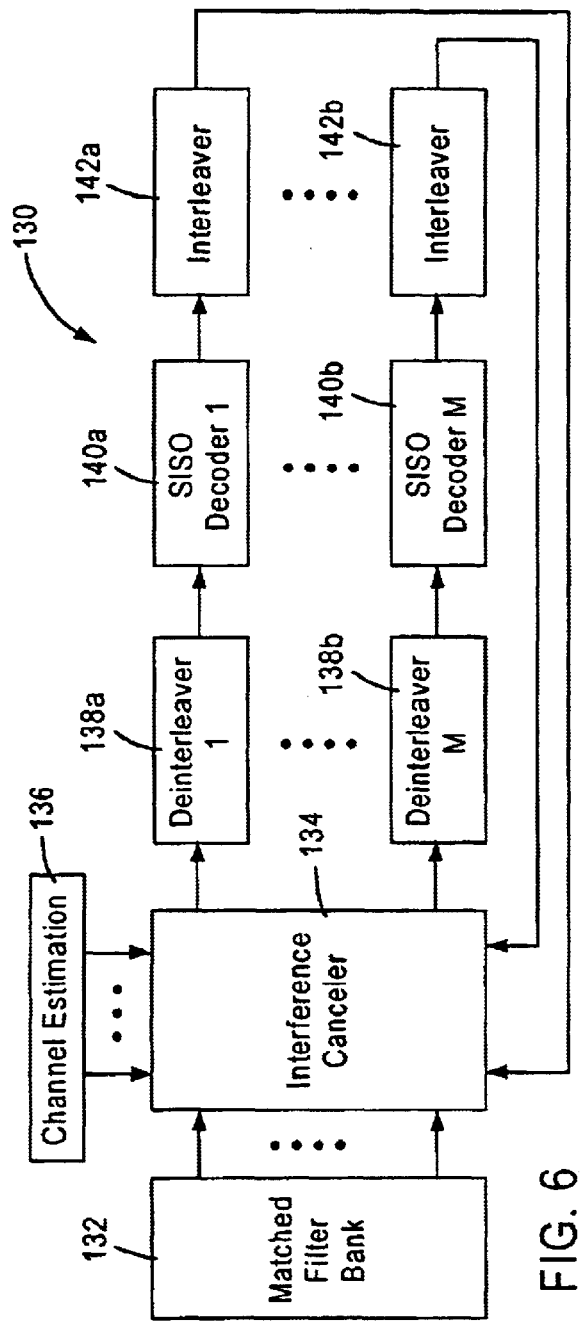
FIG. 6 is a block diagram of a multi-channel receiver which combines interference cancellation with forward error correction (FEC) decoding in accordance with the present invention.
Figure 7:
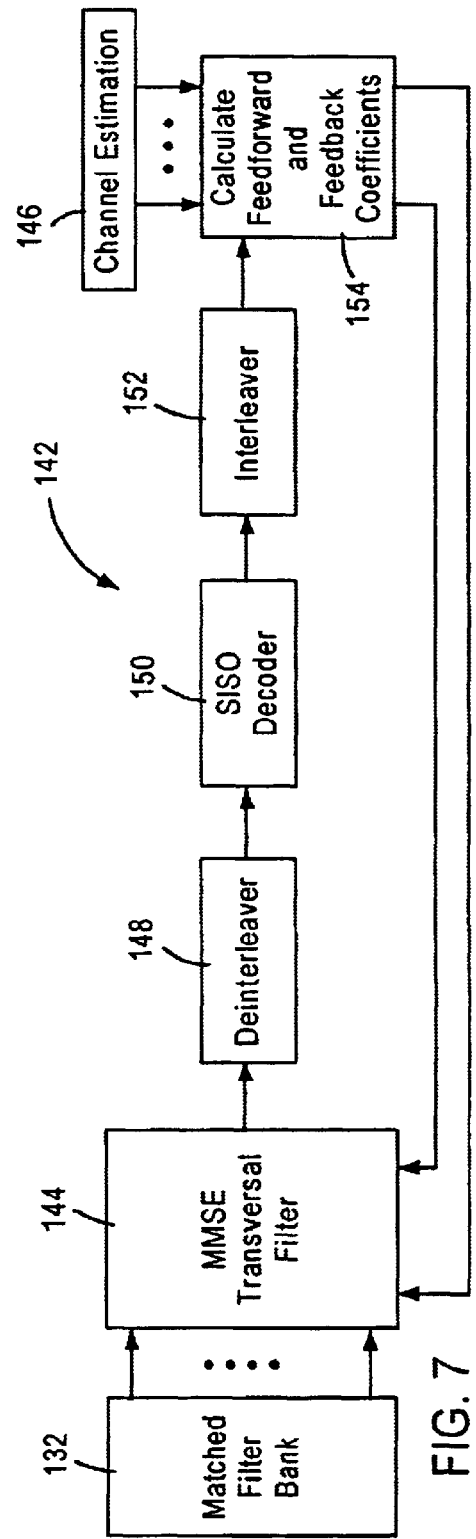
FIG. 7 is a block diagram of a single-channel receiver which combines interference cancellation with forward error correction (FEC) decoding in accordance with the present invention.

The above expression shows that $\{X_m((k+\epsilon)T_s); m=1, \ldots, M\}$ is a set of sufficient statistics which consists of an exemplary bank of matched filters 132, as shown in FIGS. 6 and 7, matched to the modulating signal in each channel, then sampled at the symbol rate of $T_s^{-1}$. More generally defined as $$x_m(t) \triangleq \int_{-\infty}^\infty \tilde{r}(a)e^{-j(2\pi\Delta f_m a + \theta_m)} p*(a-t)da \quad (12)$$

and also $$C_{l,j}(t_1, t_2) \triangleq [\int p^*(a)p(a+t_2, t_1)e^{-j2\pi(\Delta f_j - \Delta f_l)a}da]\mathrm{xexp}(-j(2\pi(\Delta f_j - \Delta f_l)t_2+(\theta_j-\theta_l))) \quad (13)$$

The function of the optimal rule, or the maximum likelihood sequence estimation receiver 136, is to determine the sequence of information symbols $(a_1, a_2, \ldots a_M)$ that maximizes the metric shown above. If there are N symbols in a frame, then the most straightforward way of implementing the optimum receiver requires $4^{MN}$ computations of the metric. However, this procedure can be implemented in the most efficient way by generalizing the modified Viterbi Algorithm (VA) of G. Ungerboeck, "Adaptive Maximum-Likelihood Receiver for Carrier-Modulated Data Transmission Systems," IEEE Transactions on Communications, pp. 624–636, May 1974. Accordingly, the metric shown above can be made recursive by the relation $$J_p(a_{1,p}, a_{2,p}, \ldots, a_{M,p}) = J_{p-1}(a_{1,p-1}, a_{2,p-1}, \ldots, a_{M,p-1}) + \quad (14)$$

$$\text{Re}\left\{\sum_{m=1}^{M} a_{m,p}^* \left[2x_m((p+\varepsilon_m)T_s) - \sum_{n=1}^{M} C_{n,m}((p+\varepsilon_n)T_s), (p+\varepsilon_m)T_s)a_{n,p} - 2\sum_{n=1}^{M}\sum_{k \leq p-1} C_{n,m}((k+\varepsilon_n)T_{s'}(p+\varepsilon_m)T_s)a_{n,k}\right]\right\}$$

Equivalently, the interference channel whose impulse response spans L symbols can be viewed as a finite-state discrete-time machine where the state at discrete time i is defined as $$S_l \triangleq (a_{1,l-1}, \ldots, a_{l,L}; a_{l,l-1}, \ldots, a_{2,l-L}; \ldots; a_{M,l-L}) \quad (15)$$

The VA then tracks the paths through the trellis and provides the solution to the problem of maximum-likelihood estimate of the state sequence. Thus, it is clear that the trellis has a maximum of $4^{ML}$ states. Note that the efficiency of this modified VA stems from the fact that maximizing the likelihood function requires computing $N4^{ML}$ instead of $4^{MN}$ metrics, wherein L is typically much smaller than N. Thus, even-though the complexity remains exponential in the number of channels, making the optimum rule computationally intensive, the complexity becomes independent of N. It is to be noted that reduced-complexity versions of the vector VA, which use decision-feedback on a per-survivor basis, may also be used. It is worth noting that this receiver does not include the FEC decoding which is done separately. This will result in a loss in performance. The reason for this is the huge complexity of the optimum joint receiver. In this invention we present a low complexity receiver for joint demodulation and channel decoding that achieves very close performance to the optimum receiver.

Before providing a suboptimal cancellation structures, the effective channel that appears at the output of the matched-filter bank, $\{x_m(t); m=1, 2, \ldots, M\}$, is characterized to yield $$x_m(t) = \left[\sum_{n=1}^{M} \sum_{i=-\infty}^{\infty} a_{n,i} C_{n,m}((i+\varepsilon_n)T_{s'}t)\right] + n_m(t) \quad (16)$$

From the above equation it is clear that the equivalent lowpass interference channel is described by the previously defined impulse response $C_{l,j}(t_1, t_2)$, which can be equivalently represented in the frequency domain as $$C_{l,j}(t_1, t_2) \triangleq [\int P(f)P^*(f-(\Delta f_j-\Delta f_l))e^{j2\pi f(t_2-t_1)}df] \times$$
$$\exp(-j(2\pi (\Delta f_j-\Delta f_l)t_2+(\theta_j-\theta_l))) \quad (17)$$

This function represents the effective channel impulse response at the output of the jth matched-filter when excited by the lth data source. It consists of the cascade of the pulse-shaping filter and the complex multiplier at the transmitter side, the channel, and the matched-filter at the receiver. It is to be noted that the impulse response in this case is time-varying, a condition that results from the presence of complex-exponential multipliers (or frequency shifters) in the system. As the channel spacing is increased, the magnitude of the impulse response decreases but its duration is increased, resulting in an equivalent channel with larger memory span. From above, $$n_m(t) \triangleq \int \tilde{n}(a) p^*(a-t) e^{-j(2\pi\Delta f_m a + \theta_m)} da \quad (18)$$

wherein, the $\{n_m(t); m=1, 2, \ldots, M\}$ is a set of zero-mean complex Gaussian random processes with covariance $$E\{n^*_i(t)n_j(t')\} = N_0 C_{l,j}(t, t') \quad (19)$$

Several assumptions are made to simplify notation. First, in regards to the pulse shaping, it is assumed that the pulse p(t) selected satisfies the Nyquist criterion of zero inter-symbol interference. This criterion is expressed in time as $$\int_{-\infty}^{\infty} p*(t)p(t+nT_s)dt = \begin{cases} 1, & n=0 \\ 0, & \text{otherwise} \end{cases} \quad (20)$$

or in frequency as $$\frac{1}{T_s}\sum_{n=-\infty}^{\infty} \left|P\left(f+\frac{n}{T_s}\right)\right|^2 = 1 \quad (21)$$

This states that the aliased or folded version of the auto-power spectrum associated with the selected pulse must be flat. (The aliased version is what results when replicating the function at multiples of the symbol rate $T_s^{-1}$.) Note that the root-raised cosine pulse, which is a practical and bandwidth-efficient choice, is defined in the frequency domain as $$P(f) = \quad (22)$$

$$\begin{cases} 1, & 0 \leq |f| \leq (1-\beta)/2T_s \\ \sqrt{\frac{1}{2}\left[1-\sin\pi T_s\left(f-\frac{1}{2T_s}\right)/\beta\right]}, & (1-\beta)/2T_2 \leq (1+\beta)/2T_s \\ 0, & \text{otherwise} \end{cases}$$

where β is the roll-off parameter. Second, the spectral overlap of these channels does not exceed 50%. This, along with practical values of the roll-off parameter, indicates that the ACI on a given channel results from one adjacent interferer on either side. Third, it is assumed that the ACI extends over a finite time interval spanning L symbols. The actual value of L is directly related to the amount of spectral overlap that exists between the channels. From basic principles of Fourier transforms, the value of L, which can be thought of as the memory of the interference channel, is larger for smaller overlap.

Fourth, it is assumed that the receiver is able to maintain phase coherence and time synchronism. For the time synchronism situation, a situation representative of a satellite down-link application, it is assumed that the relative time delays are zero. Based on the above set of assumptions, the matched-filter statistic is described as $$x_m(kT_s) = a_{m,k} + \sum_{i=-L}^{L} a_{m-1,k-i} C_{m-1,m}((k-i)T_{s'}kT_s) + \sum_{i=-L}^{L} a_{m+1,k-i} C_{m+1,m}((k-i)T_{s'}kT_s) + n_m(kT_s) \quad (23)$$

The first term on the right-hand side of the above equation is the desired information symbol; the second term is the ACI contribution from the left channel; while the third tern is the ACI contribution from the right channel. The ACI is determined by the symbol-spaced samples of the cross-correlation between transmit and receive filters. The set $\{n_m(kT_s); m=1, 2, \ldots, M\}$ has elements that are statistically correlated across different m's but independent for a specific m.

Figure 1:
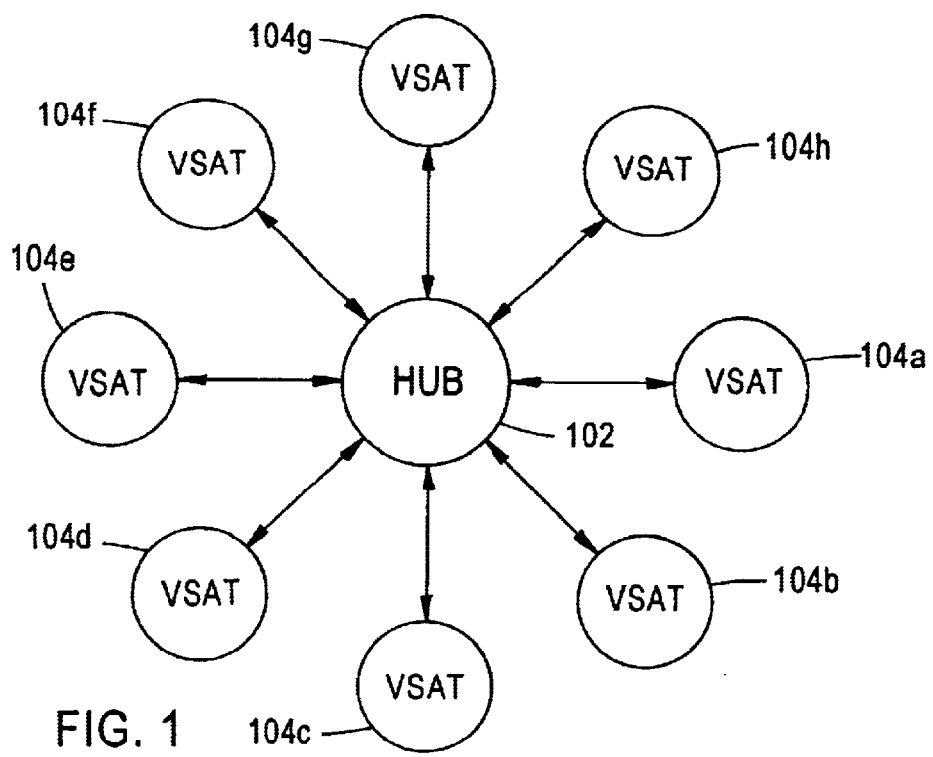
FIG. 1 illustrates a VSAT system in a star topology.
Figure 4:
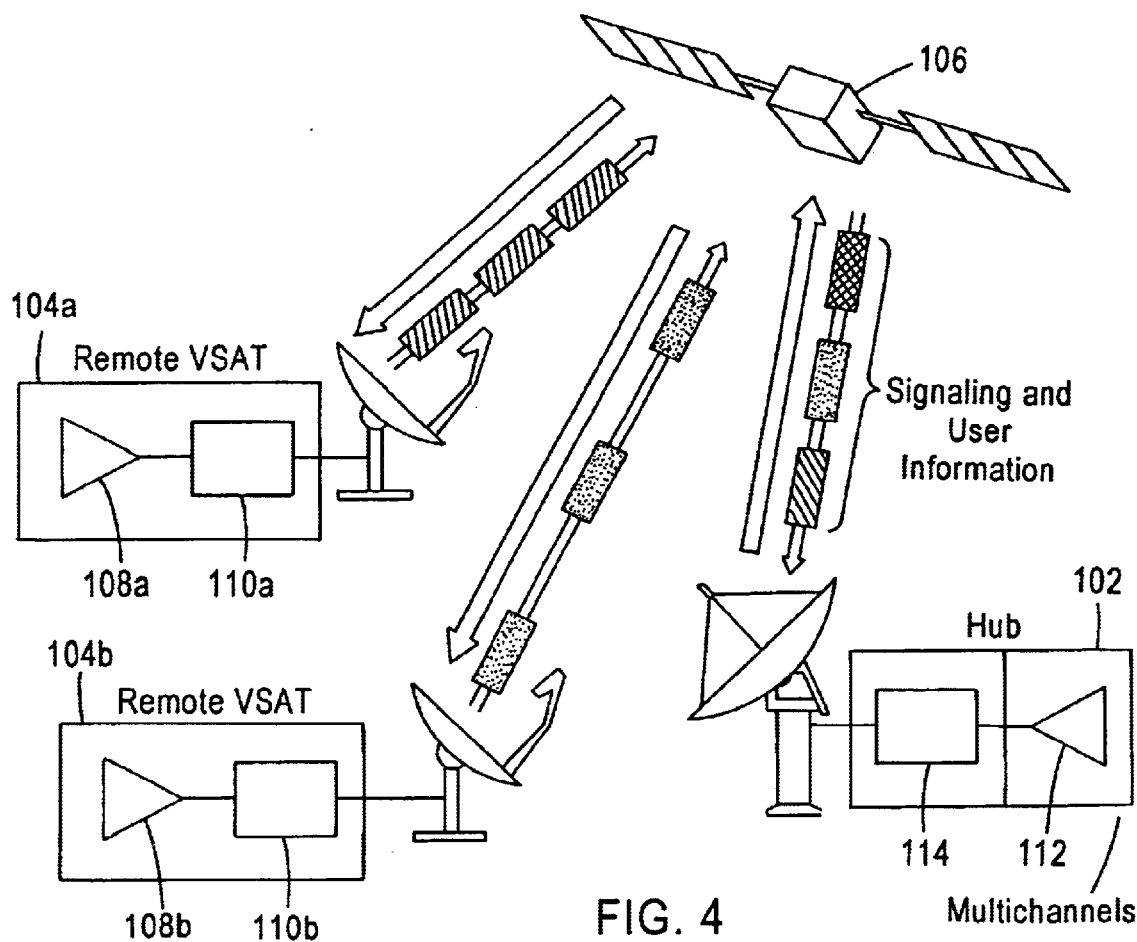
FIG. 4 illustrates a spectral view of a signal model for known systems.

FIG. 4 illustrates a spectral view of a signal model for known systems highlights the inefficiencies of the current art. As discussed above, the bandwidth is limited and an ideal scenario is to pack as many channels as possible into the limited available bandwidth. However, limitations such as interference between channels limit the number of channels that can be packed into the available bandwidth.

Figure 5:
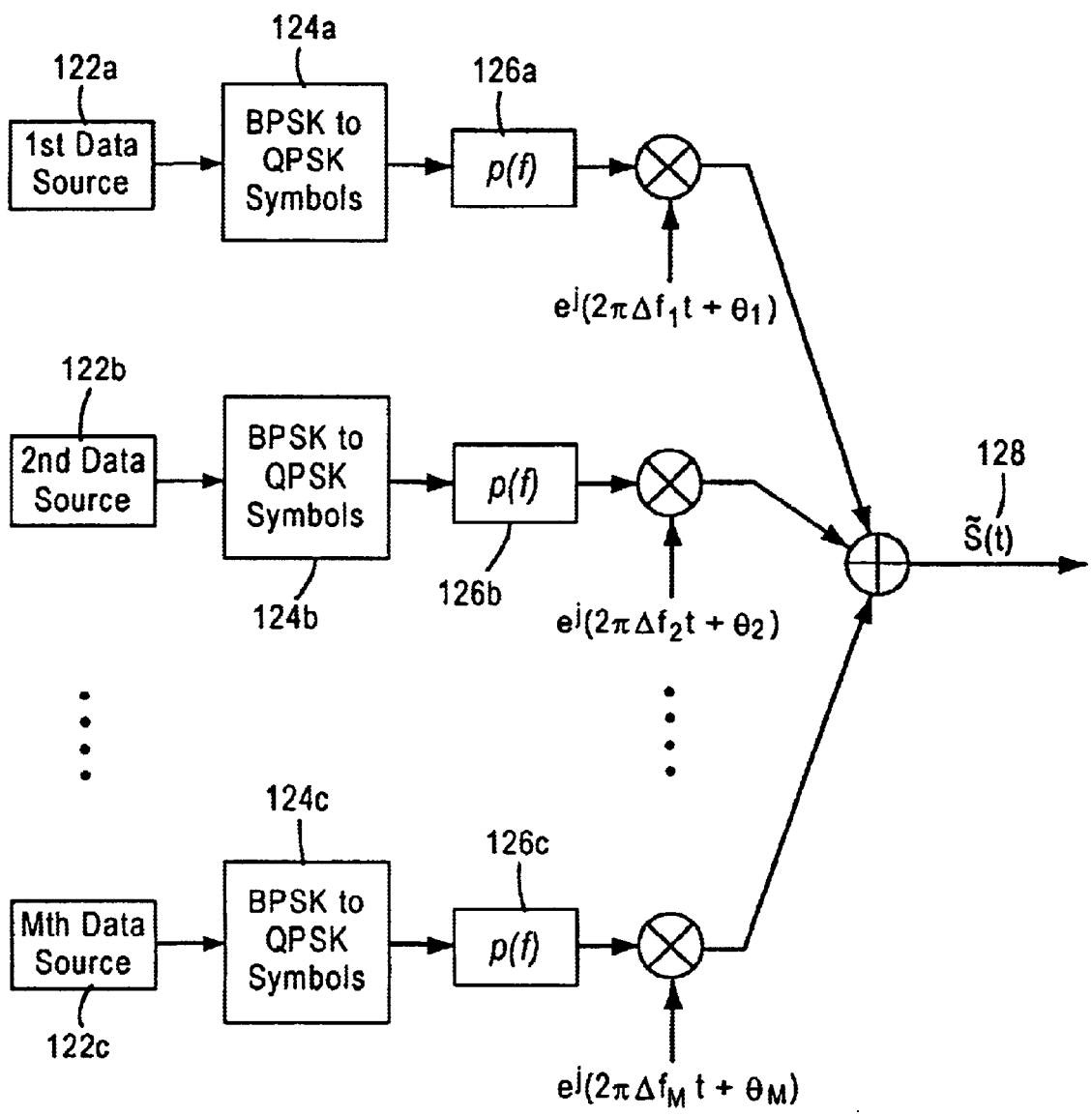
FIG. 5 illustrates a spectral view of a signal model in accordance with an embodiment of the present invention.

FIG. 5 illustrates a spectral view of a signal model in accordance with an embodiment of the present invention. Specifically, FIG. 5 depicts a 40% improvement in bandwidth efficiency over prior art systems. Channels are packed closer together in the limited available bandwidth resulting in greater bandwidth capacity. By decoding additional channels, an even greater improvement can be achieved.

Combined multi-user detection and decoding has received considerable attention recently with its potential to improve performance to match that of the single-user system. However, most of the work done has focused on spread-spectrum CDMA systems. It has been shown that the optimum receiver, for a CDMA system employing FEC coding, combines the trellises of both the multi-user detector and the FEC code. The complexity of this receiver is exponential in the product of the number of users and the constraint length of the code, making the implementation of the optimal detector prohibitive for even small systems.

Recently, a new powerful class of concatenated convolutional codes was proposed which use parallel concatenation of two (or more) recursive systematic convolutional codes (constituent codes) fed by two information sequences, of which the second is obtained from the first through the interposition of a long interleaver. One of the key factors contributing to the remarkable performance of this coding scheme is the elegant iterative Soft-Input Soft-Output (SISO) decoding structure whose performance was shown, via simulation, to approach that of the maximum-likelihood decoding, at signal-to-noise ratios very close to the Shannon limit, with much less complexity. This decoder is based on iteratively decoding the component codes and passing the so-called extrinsic information, which is a part of the component decoder soft output, to the next decoding stage. The impressive performance, achieved by this iterative decoding architecture, has encouraged several researchers to consider applying the same principle in the other sub-modules of the receivers.

In this section, several strategies for joint iterative interference cancellation and FEC decoding, which provide a tradeoff between performance and complexity, are investigated. We will restrict ourselves to binary convolutional codes; the extension to higher order codes is straightforward. The proposed algorithms function independently of the type of channel decoders in the sense that any SISO decoders can be used (for example, MAP, Log-MAP, or SOVA). The choice of a particular decoder is determined by the allowable complexity at the receiver. Based on the Gray mapping assumption, each QPSK symbol is $$a_{m,k} = a_{m,k}^I + j a_{m,k}^Q \quad (24)$$

where $a_{m,k}^I$ and $a_{m,k}^Q \in \{-1, 1\}$. Without loss of generality, we will derive the different detection rules for the in-phase k-th binary symbol associated with the m-th channel.

Denote, $$A^+ \triangleq [a_{m-1,k-L}, \ldots, a_{m-1,k+L}, +1, a_{m,k}^Q, a_{m-1,k-L}, \ldots, a_{m+1,k+L};\\ a_{j,l} \in \{e^{j\pi i/4}\}, a_{m,k}^Q \in \{-1, 1\}] \quad (25)$$

The set $A^+$ can be similarly defined. Using the independence assumption, which is justified by the interleaving, the maximum-a-posteriori (MAP) detector is given by $$L_{k,m}^I = \log \frac{\sum_{a \in A^+} P(\chi_{m,k} | a) \prod_{j \in \{m-1, m+1\}, k-L \le l \le k+L} P(a_{j,l}) P(a_{k,m}^Q)}{\sum_{a \in A^-} P(\chi_{m,k} | a) \prod_{j \in \{m-1, m+1\}, k-L \le l \le k+L} P(a_{j,l}) P(a_{k,m}^Q)} \quad (26)$$

where $L_{k,m}^I$ is the updated log-likelihood ratio, $P(\chi_{m,k}|a)$ is the conditional Gaussian distribution of the matched filter output as per (26). In (26), $P(a_{j,l})$ and $P(a_{k,m}^Q)$ are obtained from the soft outputs of the previous iteration as follows $$P(a_{j,l}^I = 1) = \frac{e^{\lambda_{j,l}^I}}{1+e^{\lambda_{j,l}^I}} \quad (28)$$

$$P(a_{j,l}^I = -1) = \frac{1}{1+e^{\lambda_{j,l}^I}} \quad (29)$$

where $\lambda_{j,l}^I$ is the output log-likelihood ratio of the previous iteration. It is clear that results similar to (28), (29) hold for $P(a_{j,l}^Q)$.

The MAP detector requires a complexity of the order $O(2 \times 4^{2(2L+1)})$ which can be prohibitive for practical applications. Therefore, in the following, a lower complexity detection rule based on the MMSE principle is developed. The iterative MAP detection rule has been proposed for CDMA signals.

This scheme, depicted in FIG. 6, uses the soft information supplied by the M single-user decoders to calculate the optimum, feed-forward and feed-back, filter weights after each iteration. FIG. 6 shows the multi-channel receiver 130 which combines interference cancellation with forward error cancellation (FEC) decoding using a matched filter 132 and channel estimation 136 as inputs to an interference canceler 134. Multiple channels M are provided from the interference canceler 134 to deinterleaver 138a . . . 138b which provide outputs to SISO decoder 140a . . . 140b and interleaver 142a . . . 142b for outputs 1 through M. The interleaver output 142a and 142b are fed back to the interference canceler 134 in a closed loop. FIG. 7 on the other hand shows the single-channel embodiment of a receiver 142 which combines interference cancellation and FEC decoding employing the match filter bank 132 with a minimum means square error (MMSE) transversal filter 144 which provides a single channel to a deinterleaver 148, SISO decoder 150, and interleaver 152 which provides input to calculate feed forward and feed back coefficients at 154. The feed forward and feed back coefficients calculation 154 also receives the channel estimation 146 to provide feed forward and feed back coefficients to the MMSE transversal filter 144. For this we extend the algorithms for CDMA signals to the current narrow band TDMA application. Let $\chi$ be a [M(2L+1)×1] complex vector of the matched filter bank outputs from the (k−L)-th to the (k+L)-th samples. Then $\chi$ can be written as $$\underline{\chi} = \sum_{j=1}^{M} \sum_{l=k-2L}^{k+2L} \underline{C}_{j,l} a_{j,l} + \underline{n} \qquad (30)$$

where, for example, $$\underline{C}_{j,l} = \sqrt{E_{b,j}} [C_{j,l}((l+\epsilon_j)T_s, (k-L+\epsilon_1)T_s), \ldots, C_{j,M}((l+\epsilon_j)T_s, (k+L+\epsilon_M)T_s)]^T$$

is the ACI associated with $a_{j,l}$, and $\underline{n}$ is the Gaussian noise vector. Let, $R^I$, the interference correlation matrix, be defined as $$R^I \underline{\Delta} [\underline{C}_{l,k-2L} \ldots \underline{C}_{m,k-1} \underline{C}_{m,k+1} \ldots \underline{C}_{M,k-2L}]^T \qquad (31)$$

and $$\underline{a} \underline{\Delta} [a_{l,k-2L}, \ldots, a_{m,k-1}, \ldots, a_{M,k+2L}]^T \qquad (32)$$

then $$\underline{\chi} = \underline{C}_{m,k} a_{m,k} + R^I \underline{a} + \underline{n} \qquad (33)$$

Now, the updated decoder input is calculated from $$y_{m,k} = \underline{c}_f^T \underline{\chi} + c_b \qquad (34)$$

$$L_{m,k}^I = Re\{y_{m,k}\} \qquad (35)$$

$$L_{m,k}^I = Im\{y_{m,k}\} \qquad (36)$$

where $\underline{c}_f$ is the [M(2L+1)×1] feed-forward coefficients vector, $c_b$ is the feed-back coefficient. Restricting the filter to have a single feed-back coefficient, rather than a vector, should not result in a loss of degrees of freedom. The coefficients $\underline{c}_f$, $c_b$ are obtained through minimizing the MSE between the data symbol and its estimate, given by $$MSE = E[|y_{m,k} - a_{m,k}|^2]$$

$$E[|\underline{c}_f^T \underline{\chi} + c_b - a_{m,k}|^2]$$

$$E[|\underline{c}_f^T (\underline{C}_{m,k} a_{m,k} + R^I \underline{a} + \underline{n}) = c_b - a_{m,k}|^2] \qquad (37)$$

It may be shown that the optimum solution based on MMSE must satisfy the following relations $$E[\underline{c}_f^T (\underline{C}_{m,k} a_{m,k} + R^I \underline{a} + \underline{n}) + c_b] = 0 \qquad (38)$$

$$E[(\underline{c}_f^T (\underline{C}_{m,k} a_{m,k} + R^I \underline{a} + \underline{n}) + c_b - a_{m,k}) \underline{\chi}^H] = 0 \qquad (39)$$

Note that the relation (38) ensures that the output of the MMSE filter is unbiased, while (39) is a direct application of the orthogonality principle. Solving (38), (39), we obtain the following results for the feed-forward and feed-back filter coefficients $$c_b = -\underline{c}_f^T R^I E[\underline{a}] \qquad (40)$$

$$\underline{c}_f^T = \underline{C}_{m,k}^H (A + B + R^n - CC^H)^{-1} \qquad (41)$$

where, by definition, we have $$A \underline{\Delta} \underline{C}_{m,k} \underline{C}_{m,k}^H \qquad (42)$$

$$B \underline{\Delta} R^I E[\underline{a} \underline{a}^H] R^{IH} \qquad (43)$$

$$C \underline{\Delta} R^I E[\underline{a}] \qquad (44)$$

and $R^n$ is the [M(2L+1)×M(2L+1)] noise covariance matrix which may be constructed using a component-wise relation. In (43)–(44), the E[$\underline{a}$] and E[$\underline{a}\underline{a}^H$] values are obtained from the following component-wise relations $$E(a_{j,l}) = E(a_{j,l}^I) + jE(a_{j,l}^Q) \qquad (45)$$

$$E(a_{j,l}^I) = \frac{e^{\lambda_{j,l}^I} - 1}{e^{\lambda_{j,l}^I} + 1} \qquad (46)$$

$$E(a_{j,l} a_{j,l}^*) = 1 \qquad (47)$$

$$E(a_{j,l} a_{i,n}) = E(a_{j,l}) E(a_{i,n}) \qquad (48)$$

where (48) follows from the independence assumption. In the first decoding iteration, we select E[$\underline{a}$]=$\underline{0}$. The feed-forward filter coefficients vector, $\underline{c}_f$, in this iteration is given by the MMSE equations derived in (41), and the feedback coefficient $c_b$=0. After each iteration, the E[$\underline{a}$] values are re-calculated using the decoder's soft outputs. The E[$\underline{a}$] values are then used to generate the new set of filter coefficients as described. In the asymptotic case where |E[$\underline{a}$]|=$\underline{1}$, the receiver is equivalent to the subtractive interference canceler. This is expected, since |E[$\underline{a}$]|=$\underline{1}$ means that previous iteration decisions, for the interference, are error-free. In this case, the subtractive interference canceler is the optimum solution. The two main sources of complexity in this algorithm are the matrix inversion operation required in (41), and the need for M SISO channel decoders. In the following, we will investigate how to lower the computational complexity by proposing a soft interference cancellation algorithm that does not require a matrix inversion operation. In addition, the performance of the MMSE SISO detector will be studied assuming single-channel decoding.

Based on (40), (41), $y_{m,k}$ can be written as $$y_{m,k} = \underline{c}_f^T (\underline{\chi} - R^I E[\underline{a}]) \qquad (49)$$

By observing that the matrix inversion operation is only required to compute the following approximation is proposed $$\underline{c}_f^T = \underline{e}_{(m-1)(2L+1)+L+1} \qquad (50)$$

where $e_{(m-1)(2L+1)+L+1}^T = [0, \ldots, 0, 1_{(m-1)(2L+1)+L+1}, 0, \ldots, 0]$. Hence, $$y_{m,k} = \chi_{m,k} - (R^I E[\underline{a}]) \qquad (51)$$

The complexity of this algorithm is a linear function of the product of the number of interfering users and the interference memory (i.e., O(2(L+1))). This algorithm can be regarded as a soft subtractive interference canceler. This is so as the decoder's soft outputs are used to calculate estimates of the transmitted symbols, E[$\underline{a}$]; the estimates of the transmitted symbols and the interference cross-correlation matrix, $R^I$, are used to generate updated estimates of the interference signals, at the output of the matched filter. The interference estimates are then subtracted from the matched filter output $x_{m,k}$ resulting in the next decoding iteration input. It is interesting to note that this MMSE-based development results in a scheme similar to the one proposed under a different derivation for CDMA signals.

Although the iterative SISO MMSE algorithm was developed assuming the use of M channel decoders, it is straightforward to modify the algorithm to be used with M matched filters but with an arbitrary number of decoders that is smaller than M. For any undecoded user d, we have $$E[a_{d,l}]=0 \text{ for any } l \tag{52}$$

after any iteration. It is particularly interesting to consider the case of single-channel decoding which is displayed in FIG. 7. In this case, the soft information is fed-back to cancel the ISI, appearing at the matched filter bank outputs, and the feed-forward MMSE filter coefficients are used to suppress the ACI. It is easy to see that, assuming error-free feedback, this algorithm is capable of suppressing the ACI, except for the edge channels effect, asymptotically.

Monte-Carlo simulations are implemented to evaluate the bit error rate performance and demonstrate the effectiveness of the proposed solutions that combine interference cancellation and FEC decoding. The FEC encoding considered is the optimum rate ½ convolutional code with 4 and 16 states and the decoder uses the soft output Viterbi algorithm (SOVA). The channel spacing used is $\Delta f=0.75T_s^{-1}$ (Hz) which corresponds to a spectral efficiency level of 2.6671 bps/Hz or an improvement of 55% compared to the current state-of-the-art.

Figure 8A:
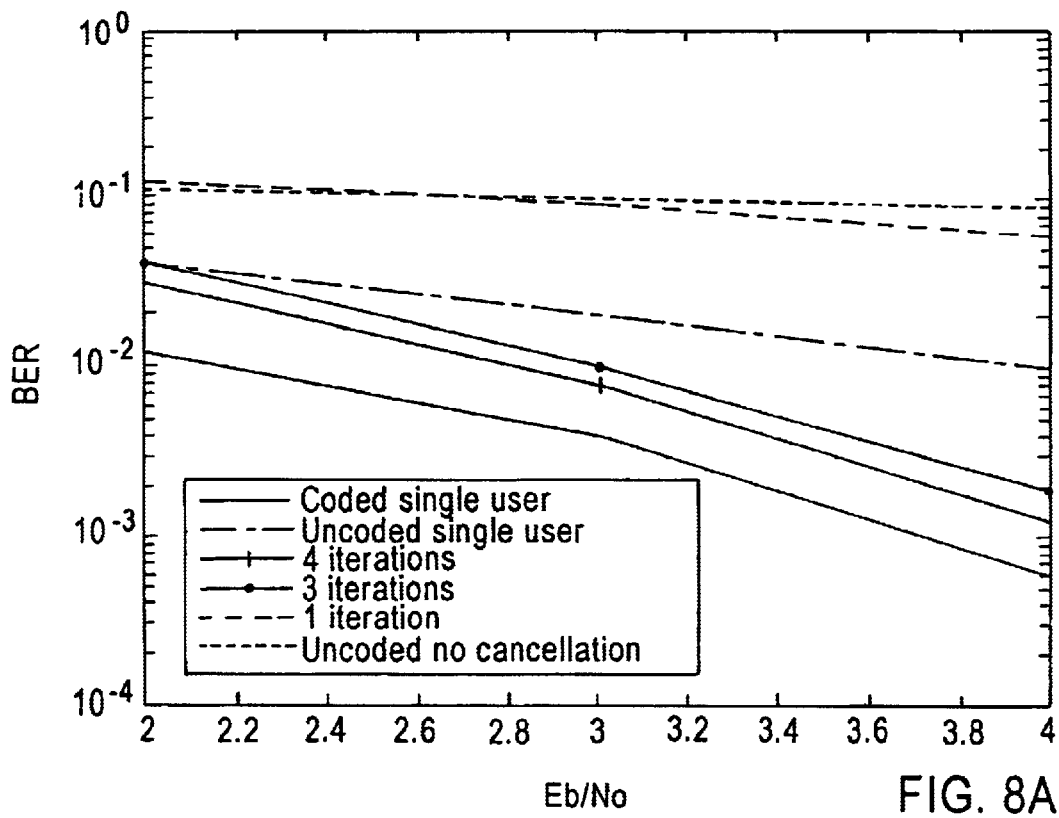
FIGS. 8a and 8b are graphs illustrating the performance of the proposed iterative multi-channel receiver at channel spacing of $0.75T_s^{-1}$ with 4 states and 16 states convolutional code, respectively.
Figure 8B:
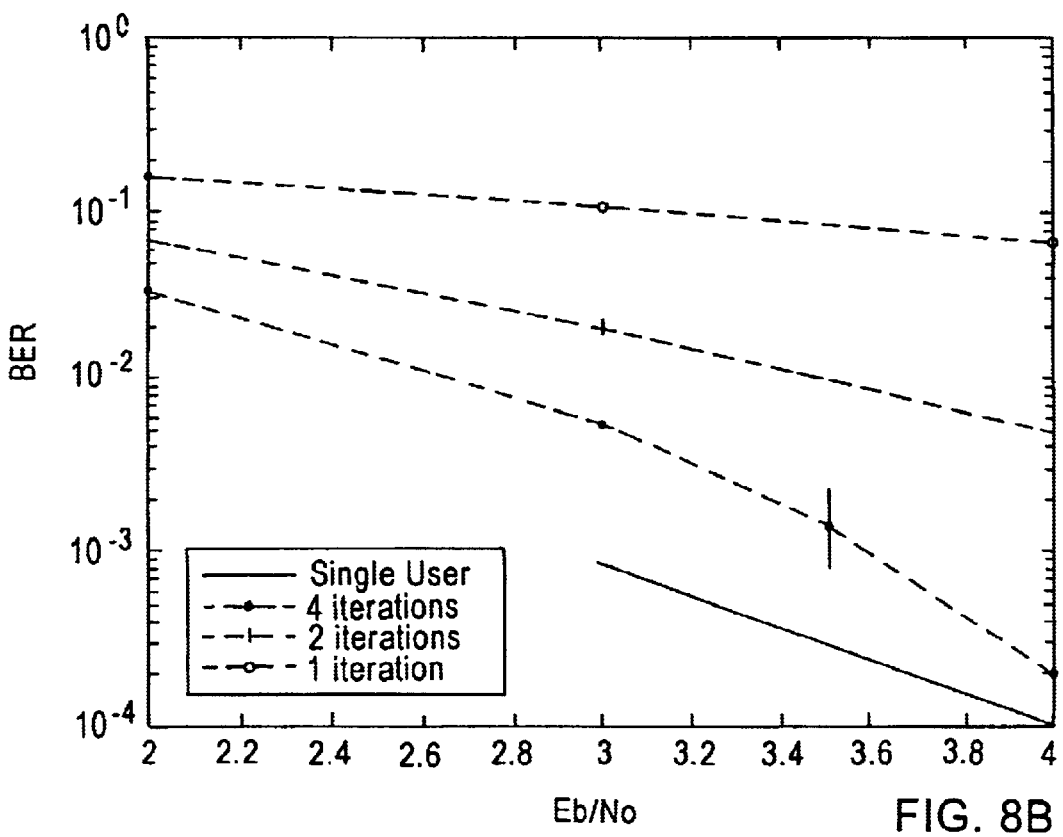

FIGS. 8a and 8b compare the performance of the soft interference cancellation scheme, the conventional receiver, and the interference-free system. The receiver processes seven channels jointly in a presence of a total of nine QPSK sources. It is clear that the performance of the proposed iterative decoding and interference cancellation algorithm is better than the conventional receiver and very close to the interference-free system, with a difference of less than 0.5 dB using four iterations when the input SNR is about 4 dB. It is also noted that as the SNR increases, the performance gap between the iterative algorithm and the conventional receiver increases while it diminishes more compared with the interference-free system.

Figure 9:
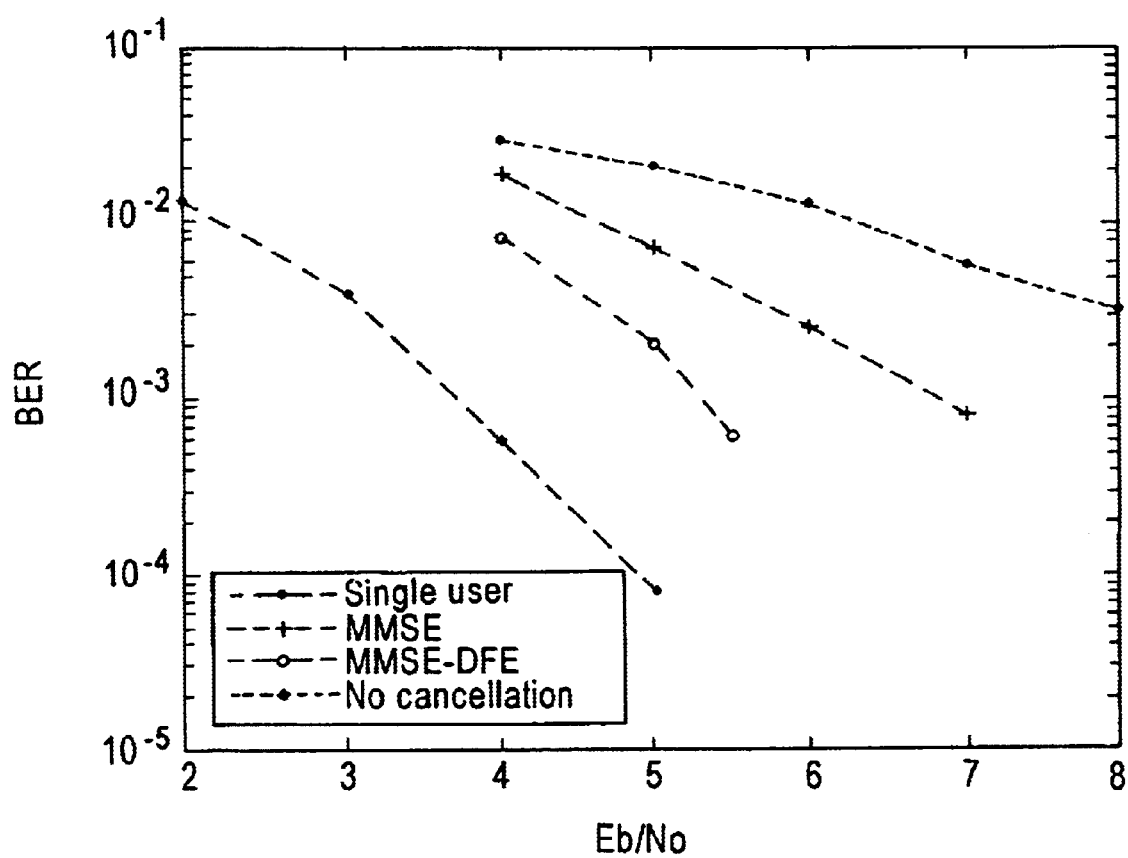
FIG. 9 is a graph illustrating the performance of the proposed iterative single-channel receiver at channel spacing of $0.75T_s^{-1}$ with 4 states convolutional code.

FIG. 9 includes the performance achieved by the iterative MMSE algorithm, assuming single-channel coding, the conventional receiver, the feed-forward MMSE receiver, and the interference-free system. The receiver has three matched filters and it was assumed that only three channels are transmitting simultaneously (i.e., neglecting the edge effect). It is clear that the proposed algorithm provides considerable gain in performance compared to the conventional receiver and the feed-forward MMSE receiver. However, the difference in performance between the interference-free bound and the single-channel decoding algorithm is between 1.5–2 dBs which may be unacceptable in some cases. The performance can be improved upon by decoding more channels, offering a tradeoff between performance quality and receiver computational load.

The present invention and its performance have been described primarily in association with the customary AWGN channel. It is however clear from concepts in this patent to extend it to the case of fading channel. This can be done, for example, by estimating the channel directly and incorporating this estimate into the reconstruction of the interference for subsequent cancellation.

In addition, it was assumed that the receiver has knowledge of the signal parameters such as timing and phase for the subset of channels that are jointly processed. It can be easily extended to the practical ease where the receiver must provide accurate estimate of these parameters. One way of generating those estimates is by assigning some known symbols at the transmitter and cross-correlating against the waveform during that portion at the receiver.

In order to prevent the synchronizing sequence from being obscured by the adjacent channels, a system level mechanism is needed to ensure that only one user is transmitting during its known symbol period.

Obviously, many modifications and variations of the present invention are possible in light of the above teachings. Thus, it is to be understood that, within the scope of the appended claims, the invention may be practiced otherwise than as specifically described above.

What is claimed is:

1. A system for enabling efficient utilization of available bandwidth through overlapping adjacent channels comprising:

a receiver for receiving a waveform having data information associated with a plurality of channels and noise information;

a filter bank adapted to:
      receive said waveform,
      generate channel information, said channel information including a first estimate of the data information on a first channel and adjacent channel interference information associated with the first channel, and
      output the channel information;

at least one decoder adapted to receive said channel information and calculate an estimated interference value;

logic configured to calculate a feed-back coefficient and a feed-forward coefficient based on an output from the at least one decoder; and an interference canceler configured to:
      receive said output channel information, said estimated interference value and said feed-back and feed-forward coefficients,
      subtract the estimated interference value from the channel information, and
      generate a second estimate of the data information using the feed-back and feed-forward coefficients.

2. The system of claim 1 wherein said estimated interference value is fed back into said interference canceler for a predetermined number of iterations.

3. The system of claim 1 wherein said interference canceler is configured to generate estimates of the data information using a minimum means square error (MMSE) algorithm.

4. The system of claim 1 wherein said interference canceler uses the feed-forward coefficients to suppress the adjacent channel interference.

5. The system of claim 3 wherein the MMSE algorithm is configured to minimize the mean square error between the data information and estimates of the data information in every iteration.

6. The system of claim 1 wherein when generating a second estimate of the data information, the interference canceler is configured to use a maximum a posteriori (MAP) algorithm.

7. A method for enabling efficient utilization of available bandwidth through overlapping adjacent channels comprising:

receiving a waveform having data information and noise information;

filtering said waveform to generate channel information, said channel information including a first estimate of the data information and adjacent channel information;

outputting the channel information;

calculating an estimated interference value using one or more decoders based on said channel information;

calculating a feed-back coefficient and a feed-forward coefficient;

subtracting the estimated interference value from the channel information; and generating a second estimate of the data information using the feed-back and feed-forward coefficients.

8. The system of claim 1, wherein the at least one decoder comprises a soft-input/soft-output decoder configured to obtain the estimates of the data.

9. The system of claim 8, wherein the soft-input/soft-output decoder executes at least one of a Maximum a-posteriori algorithm (MAP), Log-MAP algorithm, or Soft-output Viterbi algorithm (SOVA).

10. The method of claim 7 further comprising:

calculating additional estimated interference values in an iterative manner.

11. The method of claim 10 further comprising:

feeding back estimated interference values a predetermined number of times; and using the estimated interference values to generate additional estimates of the data information.

12. The method of claim 11 further comprising:

repeating said feeding back to generate increasingly accurate estimates of the data information.

* * * * *